US010273095B2

(12) United States Patent
Ragan

(10) Patent No.: US 10,273,095 B2
(45) Date of Patent: Apr. 30, 2019

(54) ELECTROMAGNETIC CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 15/518,443

(22) PCT Filed: Oct. 1, 2015

(86) PCT No.: PCT/US2015/053552
§ 371 (c)(1),
(2) Date: Apr. 11, 2017

(87) PCT Pub. No.: WO2016/069189
PCT Pub. Date: May 6, 2016

(65) Prior Publication Data
US 2017/0252784 A1  Sep. 7, 2017

Related U.S. Application Data

(60) Provisional application No. 62/072,144, filed on Oct. 29, 2014.

(51) Int. Cl.
*B65G 54/02* (2006.01)
*B60L 13/03* (2006.01)
(Continued)

(52) U.S. Cl.
CPC ............. *B65G 54/02* (2013.01); *B08B 3/022* (2013.01); *B08B 9/0813* (2013.01); *B08B 9/205* (2013.01);
(Continued)

(58) Field of Classification Search
CPC ......... B08B 9/42; B08B 9/0813; B08B 9/205; B08B 9/36; B60L 13/10; B65G 54/02
(Continued)

(56) References Cited

U.S. PATENT DOCUMENTS 3,815,535 A   6/1974 Becker et al.
3,828,833 A   8/1974 Smith et al.
(Continued)

FOREIGN PATENT DOCUMENTS

CN   101590951 A   12/2009
DE   9417849.6 U1   2/1995
(Continued)

OTHER PUBLICATIONS

European Search Report of European Patent Application No. 15856068.0, dated Jun. 4, 2018, European Patent Office, Germany.

*Primary Examiner* — Leslie A Nicholson, III
(74) *Attorney, Agent, or Firm* — James T. Cronvich

(57) ABSTRACT

An electromagnetic propulsion system for electrically conductive articles, such as aluminum beverage cans. Currents in coils disposed along a passageway induce currents in aluminum cans in the passageway. The electromagnetic fields produced by the coil currents and the eddy currents in the cans interact to produce forces that propel the cans along the passageway. A coil drive supplies the coils with a low-frequency current to propel the cans and a high-frequency current to heat the cans. The coils are arranged as solenoids encircling the passageway or as planar arrays bracketing the passageway. Besides being used to propel aluminum cans, the coils can be used to spin cans. The electromagnetic propulsion systems are shown in can washers and dryers.

20 Claims, 6 Drawing Sheets

(51) Int. Cl.
*B08B 3/02* (2006.01)
*B08B 9/08* (2006.01)
*B08B 9/20* (2006.01)
*B08B 9/36* (2006.01)
*B08B 9/42* (2006.01)
*B60L 13/10* (2006.01)
*H05B 6/10* (2006.01)

(52) U.S. Cl.
CPC .............. *B08B 9/36* (2013.01); *B08B 9/42* (2013.01); *B60L 13/03* (2013.01); *B60L 13/10* (2013.01); *H05B 6/101* (2013.01); *B08B 2203/0229* (2013.01)

(58) Field of Classification Search
USPC ........................................................ 198/619
See application file for complete search history.

(56) References Cited

U.S. PATENT DOCUMENTS

| | | | |
|---|---|---|---|
| 4,437,799 A | 3/1984 | Liu et al. | |
| 4,505,370 A | 3/1985 | Swenck | |
| 4,595,870 A | 6/1986 | Chitayat | |
| 5,080,234 A | 1/1992 | Benson | |
| 5,529,703 A | 6/1996 | Sprenger et al. | |
| 5,542,356 A | 8/1996 | Richert et al. | |
| 5,548,212 A | 8/1996 | Logue | |
| 5,690,851 A | 11/1997 | Yoshioka et al. | |
| 5,821,404 A | 10/1998 | Sprenger et al. | |
| 6,197,507 B1 | 2/2001 | Peltier et al. | |
| 6,397,990 B1 | 6/2002 | Brien et al. | |
| 9,060,390 B2 | 6/2015 | Rudner et al. | |
| 2004/0020748 A1 | 2/2004 | Kramer | |
| 2012/0288638 A1 | 11/2012 | Baxter et al. | |

FOREIGN PATENT DOCUMENTS

| | | |
|---|---|---|
| DE | 102009056320 A1 | 8/2010 |
| EP | 0425314 A1 | 5/1991 |
| EP | 0426259 A2 | 5/1991 |
| FR | 1217338 A | 5/1960 |
| GB | 191109573 A | 3/1912 |
| GB | 1441701 A | 7/1976 |
| GB | 1553241 A | 9/1979 |
| JP | S57174434 U | 11/1982 |
| JP | H01114304 A | 5/1989 |
| JP | 06-124773 A | 5/1994 |
| JP | 07-159110 A | 6/1995 |
| JP | 08-304349 A | 11/1996 |
| JP | 09-270069 A | 10/1997 |
| JP | H1085873 A | 4/1998 |
| JP | 11-18953 A | 1/1999 |
| JP | 2001093657 A | 4/2001 |
| JP | 2003215077 A | 7/2003 |
| JP | 2004131123 A | 4/2004 |
| JP | 2005086847 A | 3/2005 |
| WO | 2003105324 A1 | 12/2003 |
| WO | 2012154405 A1 | 11/2012 |

ELECTROMAGNETIC CONVEYOR

BACKGROUND

The invention relates generally to power-driven conveyors and more particularly to electromagnetic conveyors.

Transporting aluminum beverage cans on conveyor belts through the can-manufacturing process without tipping or damaging the fragile, lightweight cans is difficult. Coated or decorated cans are cured and wet cans are dried in bulk in large ovens. But large ovens are not energy efficient. Solenoidal induction heaters are used to heat cans, but the heaters use a conveyor chain or a pin conveyor to transport the cans. Cans are washed and rinsed in bulk in large washers that are not energy efficient. The washers consume large amounts of water and cleaning solution. The large conveyor belts conveying the cans in bulk through the washers must be able to withstand the cleaning chemicals and the dryer heat. And, because the lidless cans are cleaned upside down to drain, they must be inverted right-side up after cleaning to be transported reliably to downstream processing.

SUMMARY

A propulsion system for electrically conductive articles comprises a passageway that extends in length from an entrance at a first end to an exit at an opposite second end. Electrically conductive articles are admitted into the passageway through the entrance and leave the passageway through the exit. Primary coils are positioned adjacent to the passageway along its length. A coil drive provides currents in the primary coils that produce a primary electromagnetic field that induces currents in the electrically conductive articles in the passageway. The induced currents create secondary electromagnetic fields in the electrically conductive articles that interact with the primary electromagnetic field to produce a drive force directed against the electrically conductive articles to propel them from the entrance and through the exit of the passageway.

DETAILED DESCRIPTION

Figure 1:
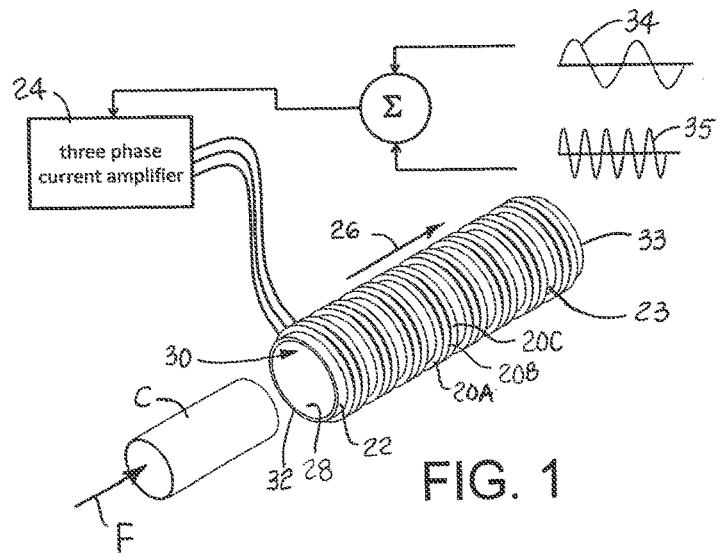
FIG. 1 is a part-isometric-part-schematic of a portion of one version of a solenoidal can-propulsion system embodying features of the invention.

One version of a can-propulsion system is shown in FIG. 1. The propulsion system includes three sets of primary coils 20A-C wound around a coil form 22 along its length to form a solenoid 23. The coils are energized by a coil drive, such as a three-phase current amplifier 24 providing currents to the three sets of coils. The energized coils produce an electromagnetic flux wave that travels along the length of the coil form 22 in a direction of propagation 26. The coil form 22 of the solenoid is elongated in the direction of propagation and made of a non-metallic material with a low-friction interior wall 28. The interior wall 28 bounds an enclosed passageway 30 that extends the length of the solenoid 23 from an entrance 32 to an exit 33. An electrically conductive article, such as an aluminum can C, inserted into the entrance 32 is propelled through the solenoid 23. The traveling electromagnetic flux wave induces currents in the aluminum can C that produce secondary, reaction electromagnetic fields that oppose the primary field of the solenoid. The interaction of the fields produces a net force F pushing the can C in the direction of propagation 26 through the passageway 30 and out the exit 33. The cross section of the solenoid's coil form 22 is circular to admit cans into the passageway top or bottom first. The inside diameter of the coil form is slightly greater than the outside diameter of the can C. That slight difference in diameters is enough to propel the can through the passageway 30 with minimal contact with the interior wall 28. The close tolerance also allows the coils 20 to be close to the can C to couple more electromagnetic flux into the can. The coil form 22 can include fluid drainage holes.

Besides propelling cans C, the solenoid 23 can also heat cans. The current amplifier produces currents with two components: a low-frequency component 34 used primarily to create the can-propelling force F, and a higher-frequency component 35 used primarily to inductively heat the cans. The higher-frequency current component induces high-frequency eddy currents in the cans C as they traverse the passageway 30. The high-frequency eddy currents heat the cans.

Figure 2:
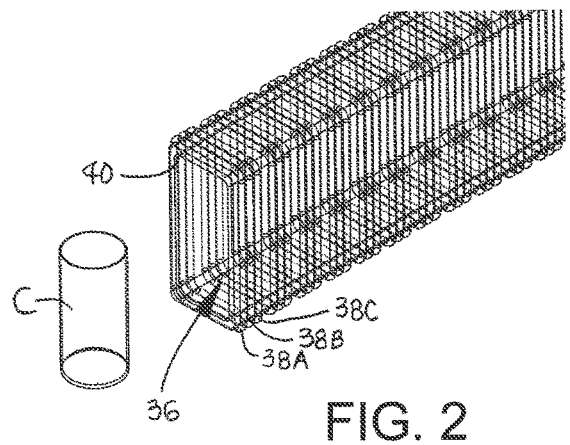
FIG. 2 is an isometric view of a portion of another version of a solenoidal can-propulsion system as in FIG. 1, but with a rectangular cross section.
Figure 3:
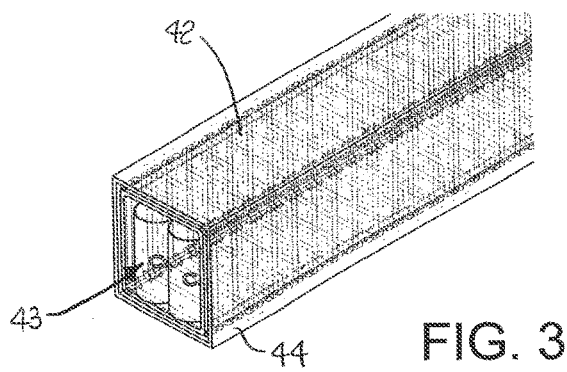
FIG. 3 is an isometric view of a portion of another version of a solenoidal can-propulsion system as in FIG. 2 for conveying two cans side by side.

FIG. 2 shows a solenoidal can heater and propulsion system with a passageway 36 having a rectangular cross section. The coils 38A-C are wound around a rectangular coil form 40 and energized by a current amplifier as in FIG. 1. The rectangular passageway 36 accommodates cans C upright or upside down. The solenoid 42 in FIG. 3 also has a rectangular cross section, but has a wider passageway 43 to accommodate a pair of cans C, side by side. The solenoid 42 is shown surrounded by a backing 44 made of a magnetically permeable material, such as a ferrite, that reduces flux leakage and increases the flux density in the passageway 43. Such a ferrite backing could be used with the other can-propulsion systems described in this description. Both the coil form 40 and the backing 44 can include drainage holes.

Figure 4:
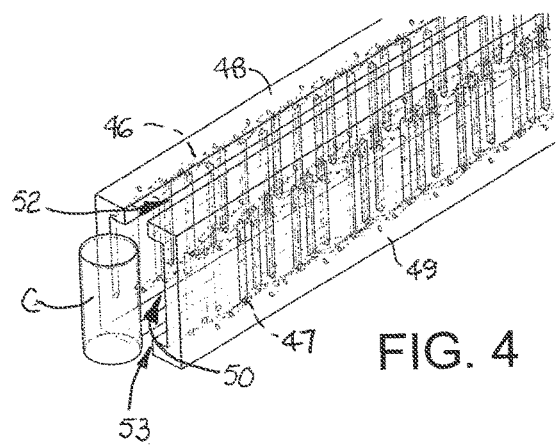
FIG. 4 is an isometric view of a portion of another version of a can-propulsion system embodying features of the invention with drive coils in side walls.
Figure 5:
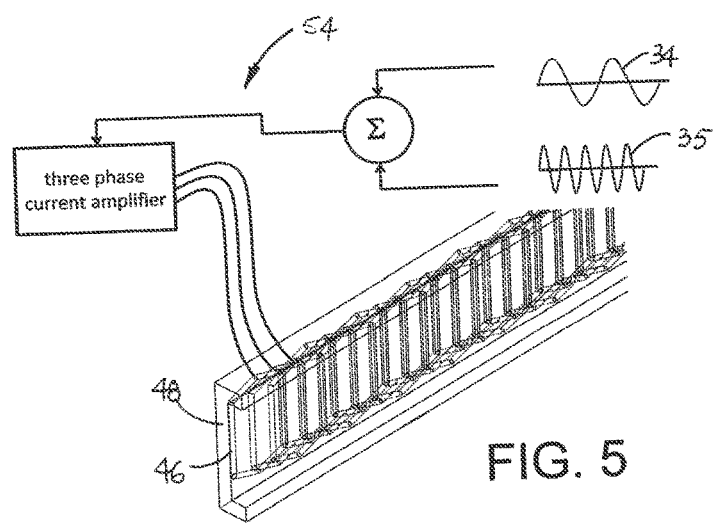
FIG. 5 is a part-isometric-part-schematic of a portion of one of the side walls of the can-propulsion system of FIG. 4 including can heating.

Instead of a solenoid, the electromagnetic propulsion system of FIG. 4 has first and second coil sets 46, 47 supported by a pair of side walls 48, 49 flanking and defining a central passageway 50. The passageway has a rectangular cross section to admit cans C side first, upright or upside down. The passageway 50 is substantially enclosed, except for entrances and exits and upper and lower slots 52, 53 between the side walls 48, 49. The slots 52, 53 are too narrow for the cans C to pass through. The only path for the cans is through the entrance and the exit. As shown in FIG. 5, the coils 46 in the side wall 48 are driven by a coil drive 54 like that of FIG. 1. The coil drive 54 provides a high-frequency heating current component 35 in addition to the low-frequency propulsion component 34. The other half of the coils (not shown to simplify the drawing) can be driven by the same coil drive.

Figure 6:
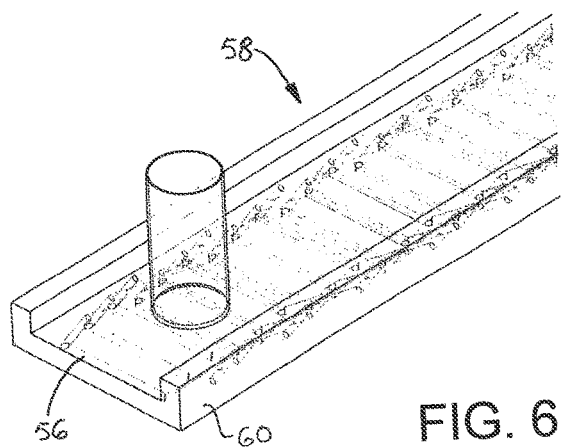
FIG. 6 is an isometric view of a portion of another version of a can-propulsion system with drive coils in the floor.

The coils 56 in the propulsion system 58 of FIG. 6 are shown embedded in a floor 60 defining the bottom of a passageway. The complementary top ceiling portion is not shown, but is similar to the floor 60. Together, the bottom floor and the top ceiling sections form the passageway with an entrance and an exit at opposite ends.

Figure 7:
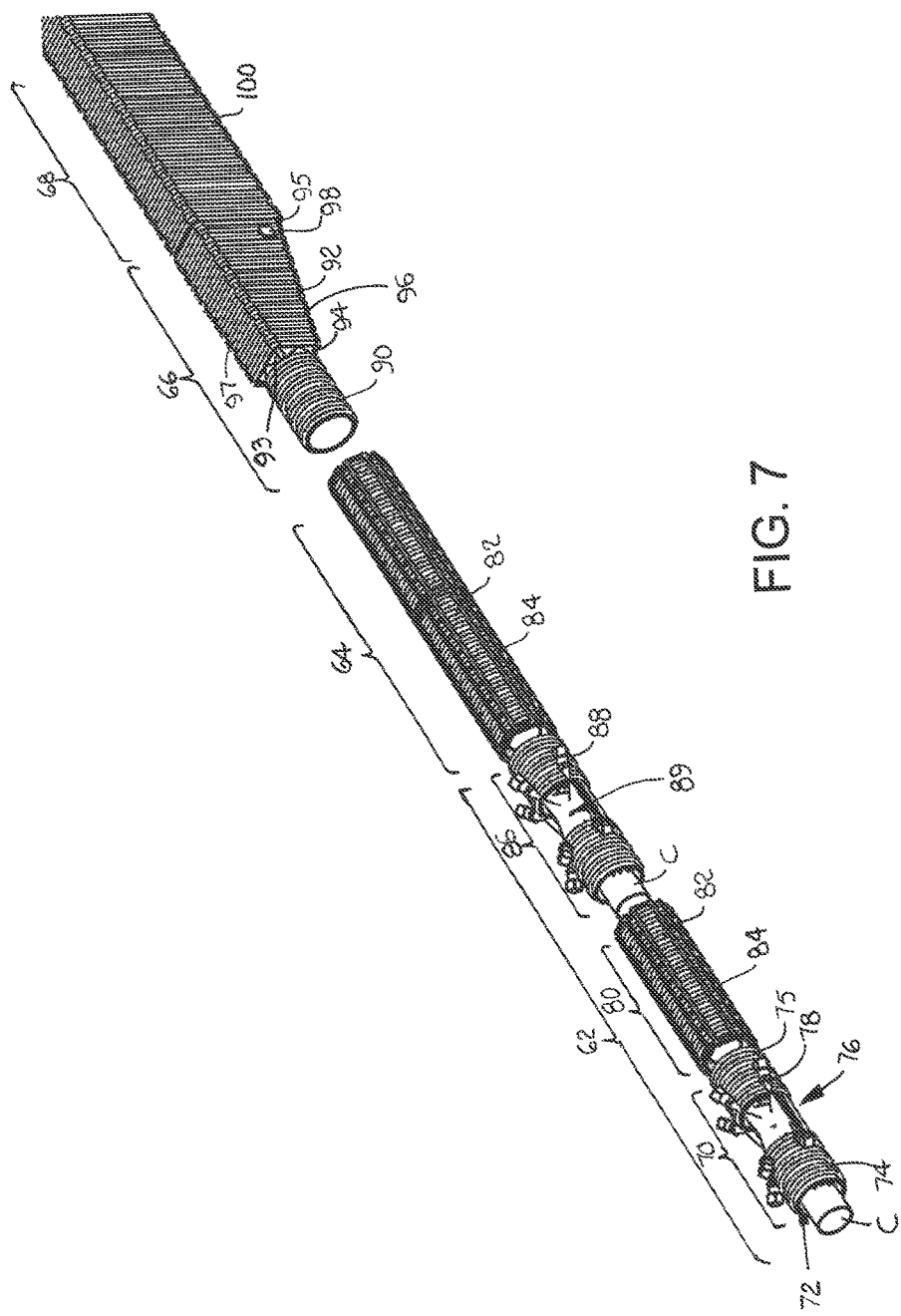
FIG. 7 is an isometric view of a can washer-dryer using a can-propulsion system as in FIG. 1.
Figure 8:
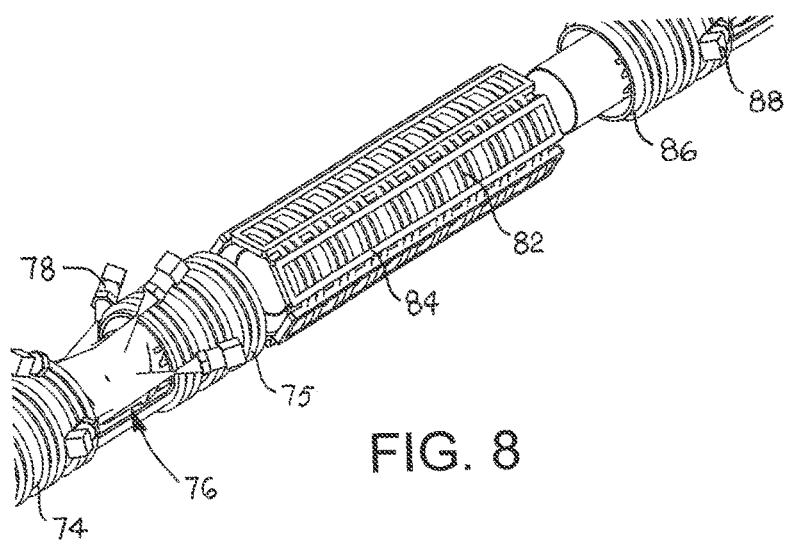
FIG. 8 is an isometric view of washing and drying portions of the can washer-dryer of FIG. 7.
Figure 9:
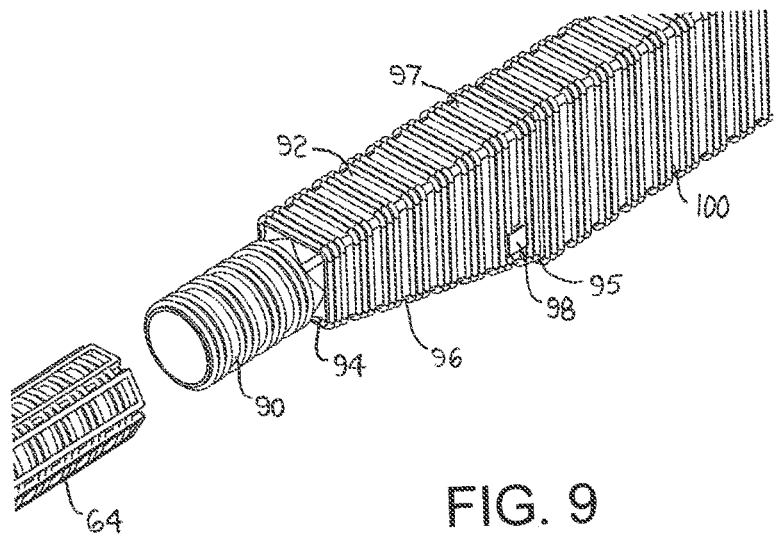
FIG. 9 is an isometric view of the can-righting solenoidal portion of the can washer-dryer of FIG. 7.

A solenoidal can washer-dryer system is shown in FIGS. 7-9. The system includes a washer section 62, a dryer section 64, a righter section 66, and a drive section 68. All the sections are solenoidal. The washer section 62 includes a first propulsion section 70 comprising a passageway 72 through two circular solenoid sections 74, 75 split by an access opening 76 through which water or cleansing fluid can be applied to the cans C by fluid ports, such as nozzles 78. The access opening 76 is not wide enough for the can C to lose significant propulsion or to escape through. The next solenoidal section of the washer 70 is a spin section 80. In addition to the primary propulsion coils 82, the spin section 80 has spin coils 84 circumferentially spaced around the periphery of the central passageway. The spin coils 84 carry currents perpendicular to the primary coil currents to produce an electromagnetic flux wave that circulates around the girth of the passageway. The spin wave induces currents in the cans C that causes them to spin, or roll, rapidly about the long axis of the cans. Oils and other liquids are spun off the rapidly spinning cans by centrifugal force. The spinning momentum is maintained as the cans enter a rinse section 86. The rinse section 86 is a propulsion section shown identical to the first propulsion section 70, except that the fluid ports 88 spray rinse water or steam on the cans C through an opening 89. The dryer section 64 is shown with spin coils 84 as well as drive coils 82. The primary propulsion coils 82 are energized with both high- and low-frequency current components to heat and propel the cans C as they are spun through the dryer section 64. The interior walls bounding the passageway could be lined with bristles or other scrubbing elements to scrub the exteriors of the cans.

After leaving the dryer section 64, the cans are propelled top or bottom first into a propulsion section 90 of the righter section 66. The righter 66 transitions the cans from top or bottom first to side first, upright or upside down. To facilitate draining, the cans C are converted in the righter 66 to an upside down orientation. The circular propulsion section 90 propels cans into a rectangular righting solenoid 92 wound around a rectangular coil form 93 whose cross sectional area monotonically increases from an entrance end 94 to an exit end 95. In the version shown in FIG. 7, the floor 96 of the righting solenoid 92 diverges from the ceiling 97 toward the exit end 95. A permanent magnet 98 along the long side of the righting solenoid 92 near the exit end 95 induces eddy currents in the lower portion of the cans that produce a drag force that rights the cans. In this way the righting section 66 changes the orientation of the cans from top or bottom leading to side first, upright or upside down. The permanent magnet can be embedded in the righter's widening rectangular coil form 93 or mounted outside it. The final propulsion section 68, which is a rectangular solenoid 100, then conveys the upright or upside down cans to downstream processing.

Figure 10:
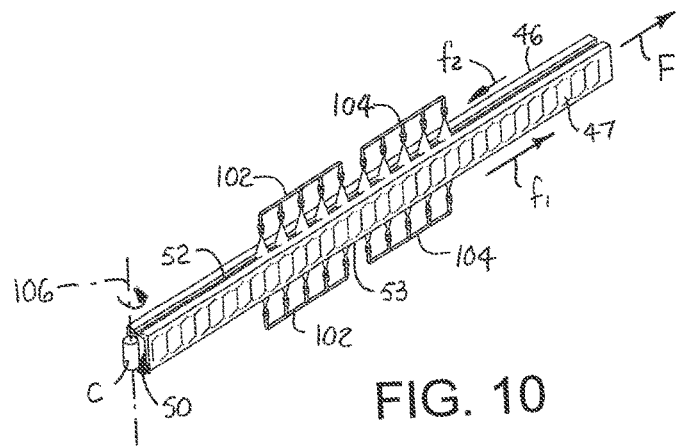
FIG. 10 is an isometric view of a can washer using a can-propulsion system as in FIG. 4.
Figure 11:
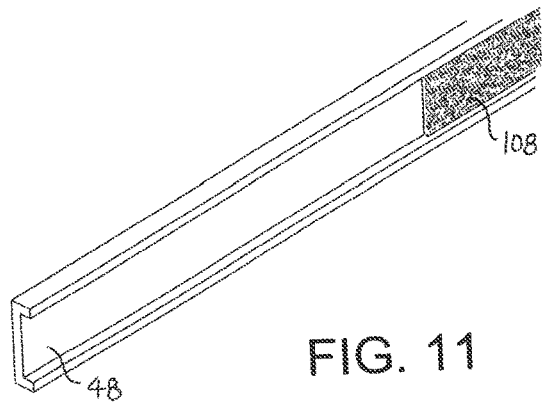
FIG. 11 is an isometric view of a portion of one side wall of the can washer of FIG. 10 with a scrubber.

Another version of a can washer is shown in FIG. 10. This version uses the propulsion system of FIG. 4 to convey the cans C. Fluid ports, such as cleaner nozzles 102 and rinse nozzles 104, direct liquid cleanser and rinsing water or steam at the cans C through the upper and lower slots 52, 53 opening into the rectangular passageway 50. The lower slot 53 provides drainage for the cleanser and rinse water. The left and right coil sets 46, 47 can be driven with currents that produce flux waves traveling in opposite directions to cause the cans to spin about their long axes 106. The magnitudes of the two currents are different to produce oppositely directed forces $f_1$, $f_2$ of different magnitudes on opposite sides of the cans. The net force F is directed in the conveying direction to propel the spinning cans through the passageway 50. As shown in FIG. 11, a scrubber in the form of bristles 108 lines a portion of the side wall 48 of the washer to scrub oils from the sides of the cans C. The scrubber can be on one side only if the cans are being spun. If not, the scrubber can line both interior side walls.

Figure 12:
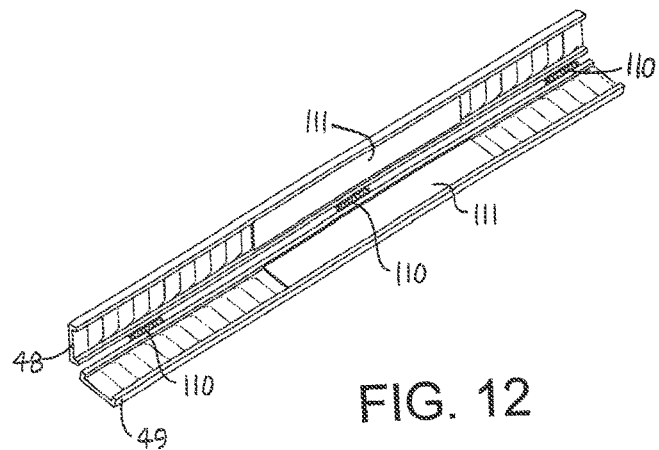
FIG. 12 is an isometric view of a hinged version of the can-propulsion system of FIG. 4.

FIG. 12 shows a hinged version of the propulsion system of FIG. 4 or the can washer of FIG. 10. Hinges 110 on one side of the side walls 48, 49 join the two halves of the propulsion system together for easy cleaning and maintenance, such as replacing scrubbing pads 111.

Figure 13:
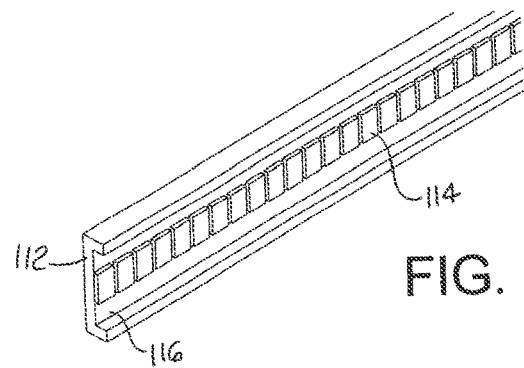
FIG. 13 is an isometric view of one side wall of a can-propulsion system as in FIG. 4 with an array of permanent magnets in the side wall.

As shown in FIG. 13, one of the side walls 112 for use with an opposite side wall having drive coils has an array of permanent magnets 114 lining the interior wall 116. Alternatively, the magnets could be recessed into or embedded in the side wall 112. The permanent magnets induce currents in the cans propelled by coils in the other half of the propulsion system. The induced currents produce fields that provide a drag on the cans to make them spin. The magnets can be arranged in a Hallbach array to increase the flux density in the passageway.

Figure 14:
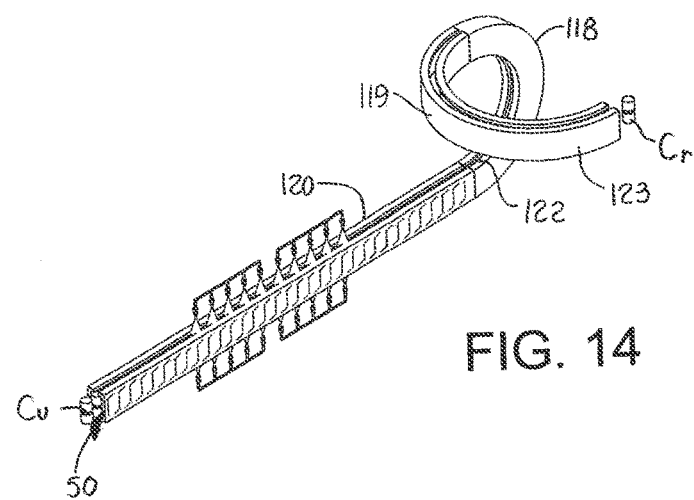
FIG. 14 is an isometric view of the can washer of FIG. 10 with a can inverter at the output.
Figure 15:
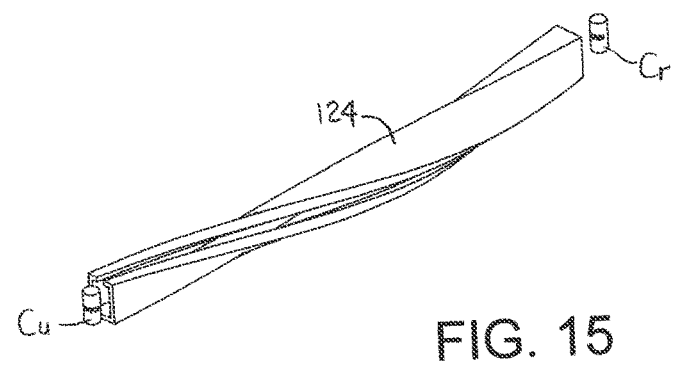
FIG. 15 is an isometric view of a can-propulsion system as in FIG. 4 with a 180° twist to invert a can.

FIG. 14 shows an inverter 118 at the exit of the can washer 120 of FIG. 10. The inverter 118 provides a 180° bend in the short side 122 of the passageway 50 to turn upside-down cans $C_u$ entering the washer right-side up upon exit. A second 180° bend 119 in the long side 123 of the passageway 50 reverses the direction of travel of the right-side-up can $C_r$. A bend in the short side 122 changes the elevation of the passageway. And another way to change an upside-down can $C_u$ to a right-side-up can $C_r$ is shown in the 180° twist passageway 124 of FIG. 15. The bends 118, 119 and the twist 124 can be passive passageways, i.e., without coil propulsion, or can be propulsion passageways adjacent to drive coils as in FIG. 4.

What is claimed is:

1. A propulsion system for electrically conductive articles comprising:

a passageway extending in length from a first end to an opposite second end and having an entrance at the first end for admitting electrically conductive articles into the passageway and an exit at the second end though which the electrically conductive articles leave the passageway;

primary coils adjacent to the passageway along its length;

a coil drive providing currents in the primary coils that produce a primary electromagnetic field that induces currents in the electrically conductive articles in the passageway that create secondary electromagnetic fields in the electrically conductive articles that interact with the primary electromagnetic field to produce a drive force directed against the electrically conductive articles to propel them from the entrance and through the exit of the passageway;

a magnetically permeable backing surrounding the primary coils.

2. A propulsion system as in claim 1 wherein the primary coils are arranged as a solenoid surrounding the passageway along its length.

3. A propulsion system as in claim 1 further comprising a hollow, elongated, nonmetallic coil form around which the primary coils are wound, the coil form having an inner wall made of a low-friction material bounding the passageway.

4. A propulsion system as in claim 3 wherein the coil form is circular in cross section.

5. A propulsion system as in claim 3 wherein the coil form is rectangular in cross section.

6. A propulsion system as in claim 5 wherein the passageway has a 180° bend.

7. A propulsion system as in claim 5 wherein the passageway has a 180° twist.

8. A propulsion system as in claim 1 further comprising fluid ports and wherein the passageway has openings through which the fluid ports supply fluid to wash the electrically conductive articles being propelled through the passageway.

9. A propulsion system as in claim 1 wherein the primary electromagnetic field produced by the coil drive and the primary coils is an electromagnetic flux wave traveling along the length of the passageway, the propulsion system further comprising a second set of coils arranged around the passageway to carry currents perpendicular to the currents in the primary coils that produce an electromagnetic flux wave that travels circumferentially around the passageway to cause the electrically conductive articles to rotate as they are propelled along the length of the passageway.

10. A propulsion system as in claim 1 further comprising scrubbing elements bounding the passageway to scrub the electrically conductive articles as they pass.

11. A propulsion system as in claim 1 wherein the cross-sectional area of the passageway increases monotonically from the first end to the second end.

12. A propulsion system as in claim 1 wherein the passageway has a circular cross section in a first portion extending from the first end toward the second end, a rectangular cross section in a second portion extending from the second end toward the first end, and a cross section transitioning from square to rectangular in a transition portion separating the first portion from the second portion.

13. A propulsion system as in claim 12 further comprising a permanent magnet disposed outside the passageway close to one end of the longer side of the cross section of the transition portion nearer to the second portion than to the first portion.

14. A propulsion system as in claim 1 wherein the primary coils extend in length along a first side of the passageway, the propulsion system further comprising an array of permanent magnets extending in length along an opposite second side of the passageway.

15. A propulsion system as in claim 1 wherein the electrically conductive articles are aluminum cans.

16. A propulsion system as in claim 1 wherein the coil drive is a three-phase current source and the primary coils include three-phase windings.

17. A propulsion system for electrically conductive articles comprising:

a passageway extending in length from a first end to an opposite second end and having an entrance at the first end for admitting electrically conductive articles into the passageway and an exit at the second end though which the electrically conductive articles leave the passageway;

primary coils adjacent to the passageway along its length;

a coil drive providing currents in the primary coils that produce a primary electromagnetic field that induces currents in the electrically conductive articles in the passageway that create secondary electromagnetic fields in the electrically conductive articles that interact with the primary electromagnetic field to produce a drive force directed against the electrically conductive articles to propel them from the entrance and through the exit of the passageway;

wherein the coil drive provides the current with a first current at a first frequency primarily to propel the electrically conductive articles and a second current at a higher second frequency primarily to inductively heat the electrically conductive articles.

18. A propulsion system for electrically conductive articles comprising:

a passageway extending in length from a first end to an opposite second end and having an entrance at the first end for admitting electrically conductive articles into the passageway and an exit at the second end though which the electrically conductive articles leave the passageway;

primary coils adjacent to the passageway along its length;

a coil drive providing currents in the primary coils that produce a primary electromagnetic field that induces currents in the electrically conductive articles in the passageway that create secondary electromagnetic fields in the electrically conductive articles that interact with the primary electromagnetic field to produce a drive force directed against the electrically conductive articles to propel them from the entrance and through the exit of the passageway;

wherein the primary coils include a first set of coils extending in length along a first side of the passageway and a second set of coils extending in length along an opposite second side of the passageway.

19. A propulsion system as in claim 18 comprising a first coil form supporting the first set of coils and a second coil form supporting the second set of coils, wherein the first and second coils forms bound the passageway, the propulsion system further comprising a hinge joining the first coil form to the second coil form.

20. A propulsion system as in claim 18 wherein the first set of coils produces a first electromagnetic flux wave traveling along the passageway from the first end to the second end and the second set of coils produces a second electromagnetic flux wave traveling along the passageway in the opposite direction, and wherein the first and the second electromagnetic flux waves have different magnitudes to cause the electrically conductive articles to rotate as they are propelled along the passageway.

* * * * *